United States Patent [19]

Fowler et al.

[11] Patent Number: 4,616,106

[45] Date of Patent: * Oct. 7, 1986

[54] GRAPHIC TABLET AND METHOD

[75] Inventors: Billy C. Fowler, Scottsdale; Alan R. Headley, Phoenix; James L. Rodgers, Mesa, all of Ariz.

[73] Assignee: Kurta Corporation, Phoenix, Ariz.

[ * ] Notice: The portion of the term of this patent subsequent to Jan. 8, 2002 has been disclaimed.

[21] Appl. No.: 631,146

[22] Filed: Jul. 16, 1984

[51] Int. Cl.[4] ............................................. G08C 21/00
[52] U.S. Cl. ...................................... 178/18; 33/1 M
[58] Field of Search .............. 178/18, 19, 20; 33/1 M, 33/23 J

[56] References Cited

U.S. PATENT DOCUMENTS 4,492,819  1/1985  Rodgers et al. ...................... 178/18

Primary Examiner—Stafford D. Schreyer
Attorney, Agent, or Firm—Cahill, Sutton & Thomas

[57] ABSTRACT

A writing tablet system is disclosed incorporating a plurality of parallel conductors imbedded beneath the surface thereof arranged in two groups in orthogonal relationship with respect to each other. The conductors form an antenna grid for receiving radiated electric signals generated remote from the tablet and supplied to a pen, or cursor, acting as a signal radiating means. The radiated signals generate signals of varying amplitude in the respective grid conductors. Each of the conductors in each of the X and Y directions are interconnected at one end thereof by resistances. The opposite ends of each of the conductors are either connected to a signal sensing circuit or are left unconnected. The unconnected conductors, or minor conductors, are arranged between the connected (or major) conductors such that radiated signals received by the antenna grid are received by all conductors but only those signals appearing on the major conductors are utilized in the determination of pen position.

6 Claims, 7 Drawing Figures

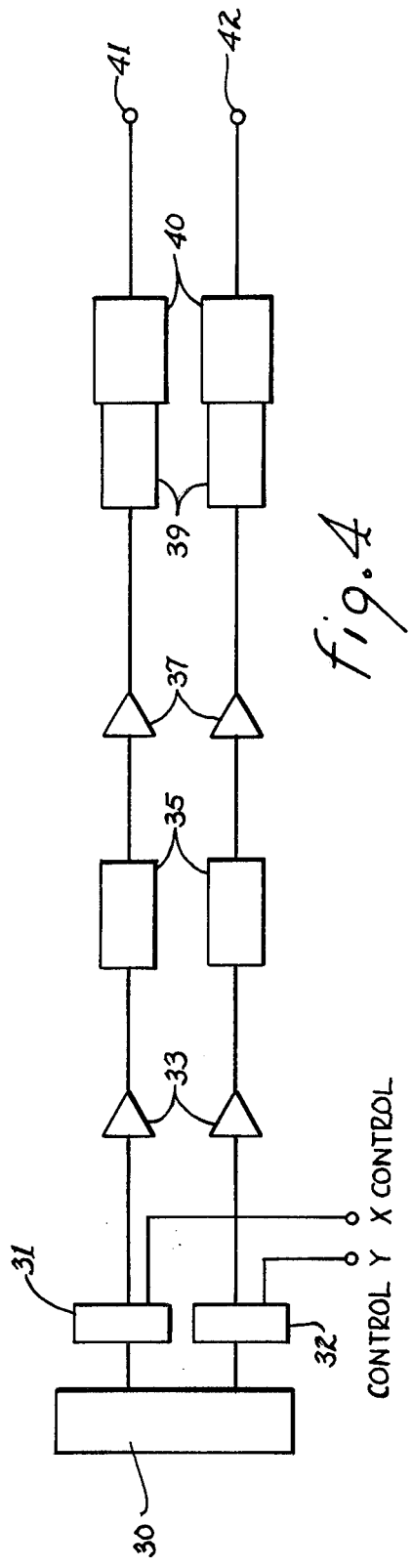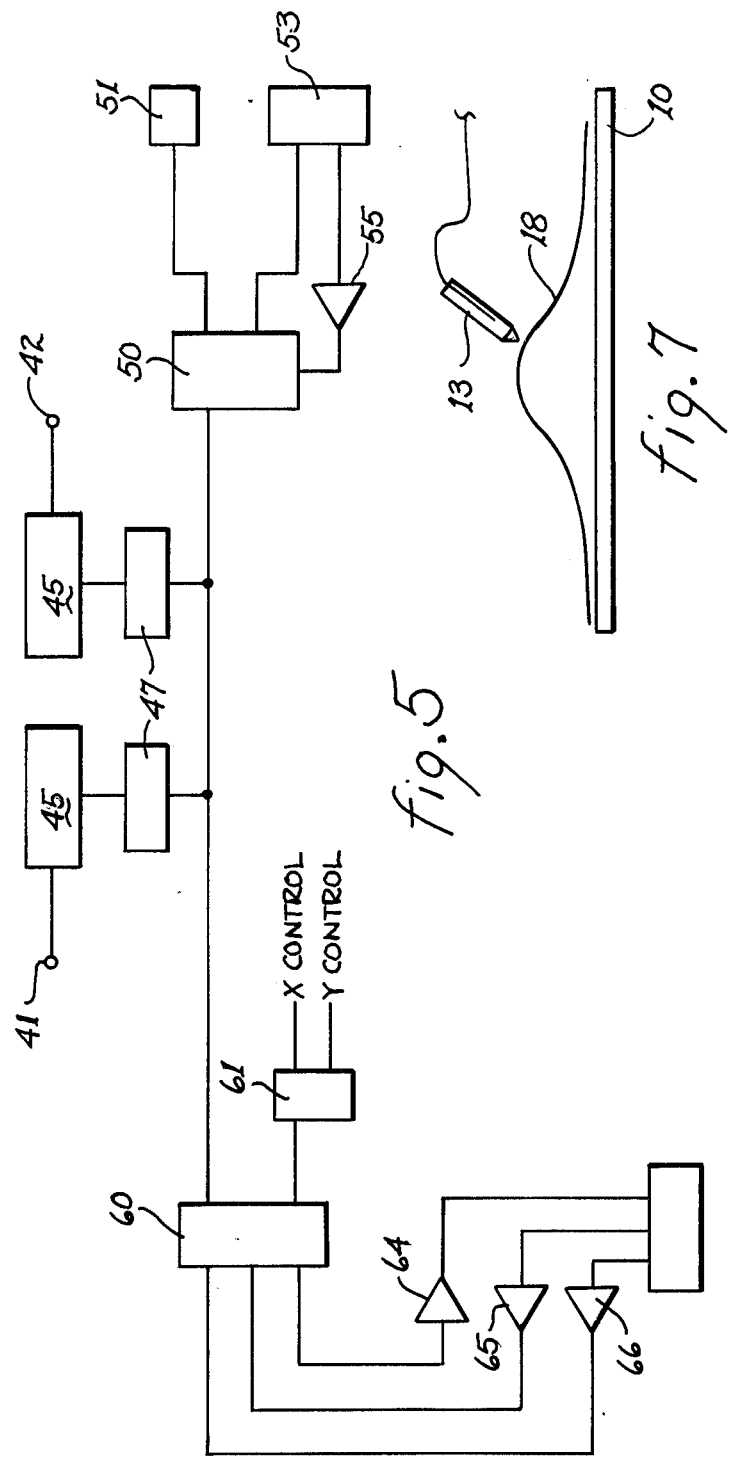

GRAPHIC TABLET AND METHOD

BACKGROUND OF THE INVENTION

1. Field of the Invention

The present invention relates to graphic tablets, and more particularly, to a tablet of the type incorporating grid wires therein and positioned beneath the surface of a tablet for receiving signals radiated from a pen.

2. Prior Art

A great variety of devices have been disclosed in the prior art for ascertaining the position of a pen on a graphic surface. These prior art techniques include the generation and radiation of electromagnetic waves as well as the radiation of electric waves. Typically, the prior art includes a means for applying power to the tablet with the pen being used as a receiving antenna for detecting the presence of a radiated signal in time and phase related to the generation of the signal in the tablet. For example, U.S. Pat. No. 3,767,858 incorporates the generation of signals supplied to the grid wires in the tablet; the signals supplied to the grid wires vary in frequency and phase. The electro-static field is sensed by the pen and is converted into an output that corresponds to the physical position of the pen apparatus. The apparatus described in this patent includes the use of two separate signal frequencies to separate the composite signals picked up by the pen; the signals are subsequently processed by separate phase-locked loops.

U.S. Pat. No. 3,851,097 discloses apparatus employing a phase-shifting technique similar to that described in U.S. Pat. No. 3,767,858, and uses phase-locked loops and frequency phase-shifts as a means for converting the position of the pen on the surface into corresponding electrical output signals. The system operates by the detection of the phase shift that occurs across the graphic surface in both X and Y directions by means of a phase-locked loop to detect the difference between the signal picked up by the pen and a reference frequency and phase source.

U.S. Pat. No. 3,886,311 discloses a pen and corresponding tablet surface employed for graphic communication. A pen capacitively picks up an electro-static field from the surface for the purpose of sensing location of the pen relative to the electrostatic field. The position of the pen is determined in terms of X and Y coordinates and provides an output signal in response to the position of the pen. The apparatus also discloses means for loading a writing element or ballpoint cartridge element by a side-loading method and discloses the use of the ballpoint element for writing on paper that may be placed on the graphic surface.

U.S. Pat. No. 3,983,222 discloses a method and apparatus for converting the position of a pen on a surface into corresponding output signals. The system involves the use of a phase shift across the surface employing an electrostatic field for transmission to a receiving pen. The pen, in turn, provides an output signal to circuitry that resolves the position of the pen on the surface. Specifically, the system involves the use of phase-shift and frequency change in a servo system incorporating a phase-locked loop and error detector to determine the displacement of the pen from a central location on the surface of the tablet. In addition, the apparatus references the frequency and phase of the signal picked up by the pen with an internal reference in the phase-locked loop and includes a bandpass filter element that converts frequency shift into phase shift. The system operates in a servo mode in which the pen movement away from its center position, in both X and Y directions, creates an error signal that results in a frequency change in a phase-locked loop. The frequency changes in such a fashion as to attempt to minimize the net phase-shift at any position in which the pen may be located. It constitutes an electrostatic closed-loop feedback means of pen position detection with respect to the apparatus of U.S. Pat. Nos. 3,878,858, 3,886,311 and 3,851,097.

U.S. Pat. No 4,022,971 discloses another graphic communication system employing X and Y conductors in the graphic surface that generate an electrostatic field; the resultant electric field is sensed by a pen employing a phase-shift and a servo system that is substantially the same as those described in the previously discussed patents. However, the apparatus also employs a means to switch the location of the active grid elements in the surface from location to location so that the actual active area of the surface is limited to a small portion of the total graphic surface. Multiplexing circuitry is employed, in addition to the basic graphic methods previously described, to move the writing surface essentially from one position to another so that the pen is always located over an active surface area. The apparatus employs an electric signal fed to grid elements consisting of X and Y conductors that are sensed by the pen; by means of measurement of error detection of frequency and phase-shift an output signal is created that corresponds to the pen location on the total surface.

OBJECTS OF THE INVENTION

It is therefore an object of the present invention to provide a method and apparatus for converting the position of a pen or cursor on a surface into output signals proportional to that position.

It is another object of the present invention to provide a method and apparatus for receiving a signal transmitted by a pen or cursor by providing an antenna comprising conductors with the signals on the conductors processed in accordance with the method of the present invention to derive a digital signal corresponding to the position of the pen on the tablet surface.

It is another object of the present invention to provide a graphic tablet incorporating passive elements for use in connection with the receipt of signals emanating from a radiating pen for the determination of the pen position on the tablet surface.

It is still another object of the present invention to provide a method and apparatus for determining the position of a pen on the surface of a tablet through the utilization of a plurality of conductors within the surface of the tablet wherein selected ones of the conductors are connected to signal sensing and processing circuits while remaining conductors remain unconnected to such circuits, except through resistances to the selected conductors.

It is still another object of the present invention to provide a method and apparatus for determining the position of the pen or cursor on the surface of a tablet by detecting signal strength of the signal received in grid wires and focusing computational efforts in that area of the tablet defined by the conductors with the greatest amplitude signal thereon combined with the signals on the conductors on either side thereof.

These and other objects of the present invention will become apparent to those skilled in the art as the description thereof proceeds.

SUMMARY OF THE INVENTION

Briefly, in accordance with the embodiment chosen for illustration, apparatus and method are disclosed for converting the physical position of a pen, or cursor, on a surface into corresponding output signals that are representative of the pen's position. The pen acts as a point signal source or signal radiating means that is activated with a signal that is transmitted from the pen to a special graphic tablet surface that in turn picks up the received signal by means of X and Y grid elements or conductors.

The X grid conductors are each interconnected at one end thereof by resistors; the Y grid connectors are similarly interconnected. The grid elements or conductors may conveniently be formed on an insulating substrate by deposition techniques. Similarly, the resistances interconnecting the adjacent conductors in each of the X and Y directions may be deposited on the substrate. The X and Y conductors, arranged in an orthogonal relationship, are separated by a thin insulation layer. Selected conductors in each direction, which may conveniently be called major conductors, are connected to a signal sensing circuit to permit the signals appearing thereon to be processed. The remaining conductors, which may conveniently be called minor conductors, are positioned between the major conductors and, while they are interconnected with adjacent conductors with resistances at one end thereof, simply terminate in the grid without connection. The pattern of major and minor conductors forms an antenna for the receipt of radiated signals emanating from the pen or cursor.

The signals present on the major conductors are processed in accordance with the method of the present invention wherein the conductor with the largest signal thereon, together with the conductors on either side thereof, form that portion of the entire grid upon which attention is directed for the calculation of pen position. The signals from these three major conductors are converted to digital form, are compared, ratioed, and transformed in accordance with the method of the present invention to a digital signal representing the position of the pen or cursor on the surface of the tablet.

BRIEF DESCRIPTION OF THE DRAWINGS

The present invention may more readily be described by reference to the accompanying drawings in which:

FIGS. 4 and 5 are schematic diagrams of the control circuit of the system of the present invention.

FIG. 7 is an end view of a graphic tablet showing a pen positioned over the tablet creating a bell-shaped signal distribution in the surface of the tablet.

DETAILED DESCRIPTION OF THE PREFERRED EMBODIMENT

Figure 1:
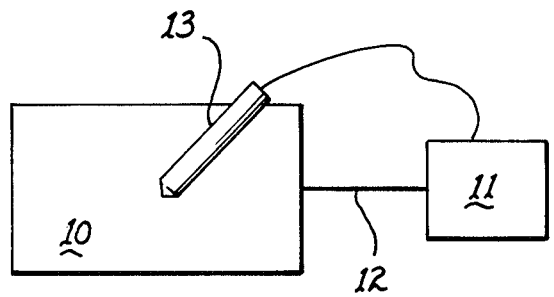
FIG. 1 is a schematic block diagram of a graphic tablet shown connected to a control circuit which in turn is connected to a pen or cursor constructed in accordance with the teachings of the present invention.
Figure 2:
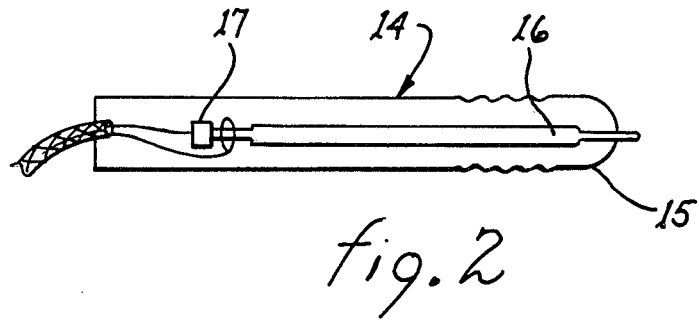
FIG. 2 is schematic diagram of a pen useful in the description of the present invention.

Referring to FIG. 1, a tablet 10 is shown connected through a cable 12 to sensing and control circuitry 11. The tablet 10 acts as an antenna to pick up signals radiated by a pen or cursor 13. The signals are transmitted through the cable 12 to the sensing and control circuitry 11 for processing to drive a digital indication of the position of the pen 13 with respect to the surface of the tablet 10. Referring to FIG. 2, a suitable signal radiating means such as a pen 14 is shown wherein a pen housing 15 encloses a cartridge 16 that may be utilized to write on a sheet of paper or the like positioned on the tablet. The signal is radiated from the tip of the pen and is supplied to the pen through a pen switch 17. The pen may be constructed in a manner described in copending application Ser. No. 6/454,695 now U.S. Pat. No. 4,492,819 assigned to the assignee of the present invention. The frequency of the signal radiated by the pen may be chosen to avoid interference with other equipment; for example, it has been found that a frequency of approximately 55 kH is appropriate. The system of the present invention is not frequency dependent, and variations in the frequency will not affect accuracy of the system. It may also be noted that the present system will be described in terms of the radiation of electric signals from the pen 14; however, electromagnetic radiation may be used although modification of the pen design will be required.

Figure 3:
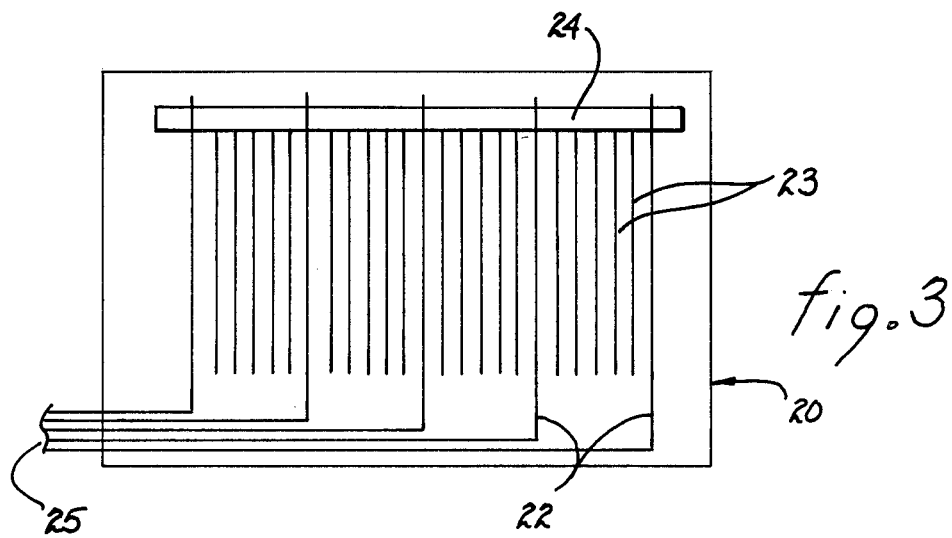
FIG. 3 is a schematic diagram of a graphic tablet showing major and minor conductors arranged in accordance with the teachings of the present invention.

The signals radiated by the pen 14 are detected by an antenna formed by the tablet 10. Referring to FIG. 3, a schematic representation of the structure of the tablet is shown. For purposes of simplicity, the tablet shown in FIG. 3 includes only the X conductors, it being understood that an orthogonally positioned grid of Y conductors would be superimposed, and insulated from, the X conductors shown in FIG. 3. Referring to FIG. 3, the tablet 20 is shown including a plurality of conductors 22 that are arranged parallel to one another and include one end interconnected with adjacent conductors through the utilization of a resistor 24. As mentioned previously, the resistance 24 as well as the conductors 22 may be conveniently deposited on a substrate material and need not be in the form of discreet elements. Further, it has been found convenient to deposit the X and Y grid conductors on the opposite sides of a substrate formed of a plastic sheet. The electrical interconnection of the conductors 22 is therefore provided by the resistance 24. Intermediate the major conductors 22 there is provided a plurality of minor conductors 23 which are also arranged parallel to each other and parallel to the major conductors and are interconnected to the remaining conductors through the utilization of the resistance 24. The minor conductors, while interconnected to adjacent conductors through the resistance 24, are nevertheless open ended at their opposite ends. In the embodiment chosen for illustration there are a total of five minor conductors, uniformly spaced, between the respective major conductors. The major conductors 22 extend from their interconnection with adjacent conductors through the resistance 24 to their opposite ends 25 which are connected to a signal sensing and processing circuit such as the sensing and control circuitry 11 of FIG. 1. Again, it will be understood that a second arrangement of electrical conductors, orthogonal to those shown in FIG. 3, will be formed on the tablet 20 to provide a grid of X and Y conductors.

The orthogonally related conductors will similarly incorporate major and minor conductors arranged in an identical manner to that shown in FIG. 3 but separated from the conductors shown in FIG. 3 by an insulating layer. The major and minor conductors thus form an antenna for receiving signals radiated from the pen. When the signal appearing on a major conductor is sensed, that signal is the result of the receipt of the radiated signal from the pen striking all of the conductors. That is, the signal appearing on the sensed major conductor is a result of the reception of the radiated signal by the minor and major conductors in the particular grid being sensed. Thus, the signal on the sensed conductor is a composite of the effects of the signal received by that conductor as well as contributions from the remaining conductors in the grid. Since all of the conductors are interconnected with a resistance, the effect upon the signal in the sensed conductor will be the greatest from those conductors that are adjacent thereto. As the conductors are spaced further from the sensed conductor, the effect upon the signal on that sensed conductor will be reduced by the fact that a remote conductor contributes only the signal generated therein by the radiated signal divided down by the amount of interconnecting resistance between that conductor and the sensed conductor.

The utilization of minor conductors provide a means for reducing the amount of circuitry necessary to achieve a particular level of resolution of pen position. For example, with a given spacing between conductors, wherein all of the conductors are connected to sensing circuitry, the signal appearing on adjacent conductors may be utilized to determine the position of the pen between the conductors. However, to conserve the amount of circuitry required to achieve the computations, the conductors are placed further apart thus reducing the sensitivity of the pen position placed between the conductors. The resolution with which the system can then determine the pen position is adversely affected. The utilization of minor conductors permits the reception of the radiated signal between the major conductors wherein the sensed signal in the minor conductors contributes to the signal level in the major conductors. In this manner, without increasing the quantity or quality of the sensing circuitry connected to the grid, the grid is nevertheless enabled to greatly improve its resolution.

The ends of the major conductors shown at 25 in FIG. 3, as well as the corresponding ends of the orthogonally related conductors, are connected through a connector 30 (FIG. 4) to selectors 31 and 32. The selectors 31 and 32 are connected through bandpass filters and amplifiers 33 to detectors 35; the output of the detectors are amplified through amplifier/low pass filters 37 and applied to integrators 39 and analog-to-digital convertors 40. The resulting signals appearing at terminals 41 and 42 are digital signals representing the amplitude of the analog signals on the selected X or Y major conductors.

The digital signals appearing at terminals 41 and 42 of FIG. 4 are applied to counters 45 (FIG. 5) which supply latches 47 for the temporary storage of the digital numbers supplied thereto. These digital signals are made available to microprocessor 60 which also receives signals from the latch 50 which in turn receives mode/-baud signals from switch 51. Cursor signals and pen detector signals are received through the connector 53 and are supplied to the microprocessor 60. The microprocessor provides control signals through the latch 61 and also provides an interface for the resultant output digital signal through output amplifier 64; similarly, communication to external devices such as CRT's, printers, etc. are provided by an input amplifier 65 and a signal receiving amplifier 66 indicating appropriate timing for the transmission of digital signals from the microprocessor.

Figure 6:
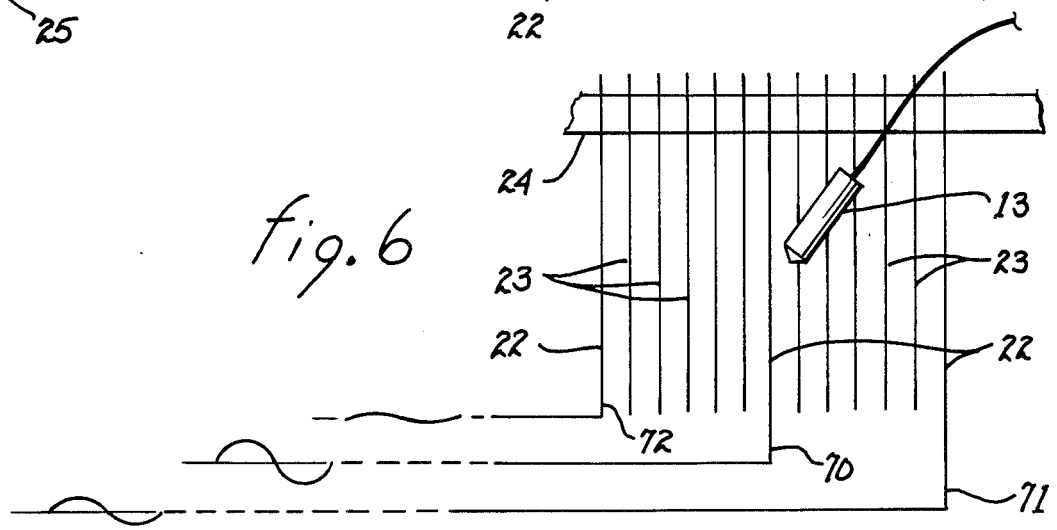
FIG. 6 is an enlarged portion of FIG. 3 useful in describing the present invention.

Under program control from the processor 60, the selectors 31 and 32, connected to the major conductors of the tablet, sense the highest voltage, or signal of highest amplitude, on the major conductors in the X and Y direction. Considering for purposes of simplicity only the X conductors, and referring to FIG. 6, assuming that the pen 13 is in the position shown, it may be seen that the signal occuring on line 70 has the greatest amplitude, the signal on line 71 is of a lesser amplitude, while the signal on line 72 is smaller than either of the other two. Under program control, the selector then uses the amplitude of the signal appearing on the major conductor with the highest amplitude together with the amplitude of the signals appearing on the adjacent major conductors to detect the position of the pen 13 in the X direction. The remainder of the signals appearing on the major conductors are ignored and it is only the three conductors containing the highest amplitude signals that are utilized in the calculations to determine position of the pen. Each of the signals appearing on the major conductors 70, 71 and 72 of FIG. 6 are then processed in the circuitry of FIGS. 4 and 5 in the following manner. The signals are converted to a DC level in the respective detectors and then converted to a digital format in the analog-to-digital converter 40. The signal levels, in digital format, are then manipulated as follows. The lowest amplitude signal, which may be designated C, is subtracted from the digital form of the amplitude of the signal on conductor 70 (the largest signal, designated A) and is subtracted from the digital amplitude of the signal on the conductor 71 (the intermediate level, C). The resulting differences are then ratioed to eliminate variations in signals or signal amplitudes due to such extraneous matters as strength of signal being emanated from the pen, thickness of paper that may separate the pen from the tablet, etc. This ratioed quantity is then multiplied by a constant (to be described) and added or subtracted to the X axis address of the major conductor having the largest signal amplitude. For example, if it is desired to provide a resolution of pen location equal to one thousand divisions between respective major conductors, then it may be possible to describe the X location of the pen in terms of the address of the major conductor with the largest signal thereon plus or minus a fraction of the one thousand divisions. Therefore, if it is assumed that the X address of the major conductor is, for example, 7,000, then the ratioed quantity described above multiplied by a constant of 500 will represent the address 7,000 plus or minus a number up to 500. In the example shown in FIG. 6, since the pen 13 is to the right of the major conductor 70 and is located between conductors 70 and 71, the ratioed quantity times 500 would be added to the address (7,000) of the conductor 70. The determination of the sign of the ratioed quantity may simply be determined by knowing which of the adjacent conductors has the larger signal. For example, in the example shown in FIG. 6, the major conductor 72 (to the left) has a lesser amplitude signal than the conductor 71. By convention, if the adjacent conductor to the left has the lower signal, of the two adjacent conductors, then the ratioed quantity is added to the address of the major conductor having the largest signal thereon. If we let the amplitudes of the signals appearing on the major conductors 70, 71 and 72 equal to A, B and C respectively, then the mathematical notation of the above manipulation would appear as follows:

$$A - C = A'$$

$$B - C = B'$$

$$A'/B' \cdot k = p \, (\pm)$$

and $X = $ (address of major conductor) $+ (\pm p)$ where

A = amplitude of signal on line 70
B = amplitude of signal on line 71
C = amplitude of signal on line 72
k = constant (if we choose to calculate pen position to within 1000 divisions of distance between major conductors, then k = 500)
p = quantity to be added or subtracted, and is equivalent to distance from major conductor having largest signal thereon
X = address of pen on tablet surface (in X direction)

The above calculations provide only the address of the pen on the surface of the tablet in the X direction. Identical calculations are simultaneously made to determine the address of the pen in the Y direction. Thus, in the above example, the address of conductor 70 is a fixed number while the amplitude signals detected by the conductors is an analog quantity that may vary. Since we are interested not in signal amplitude, but only where the amplitude is a maximum, the above technique eliminates dependence on signal amplitude and permits the derivation of a pen address, in relation to a known or fixed conductor address, by ratioing the amplitudes occuring on three adjacent major conductors and using the resultants to calculate a digital position.

In the example shown in FIG. 6, if the pen 13 were to be moved to the left of the major conductor 70, the signal appearing on conductor 72 would increase while the signal appearing on conductor 71 would decrease. Under such circumstances, the quantity "p" would be a negative quantity to be added to the address of the conductor 70. Thus, referring to FIG. 6 and assuming the address of the major conductor 70 is 7,000, and assuming that the calculated number "p" is for example 130, then the X address of the pen 13 would be 7,130. Conversely, if the pen 13 were positioned the same distance from the major conductor 70, but was located left of the conductor 70 (as shown in FIG. 6), the address of the pen 13 would be 7,000-130, or 6,870.

The "focusing" or concentration of the calculations upon only three of the major conductors presents unique advantages to the overall system. The sensitivity of the tablet as an antenna to radiated signals is not impaired; however, when a signal is presented from a radiating means such as the pen shown in the present invention, the signal levels appearing on the major conductors, for example in the X direction, may be plotted in the form of a bell-shaped curve (FIG. 7). This bell-shaped curve 80, which may be considered an indication of the detected signal strength on the surface of the tablet 10, results from two principal factors. First, the strength of the signal appearing on the surface of the tablet is a function of the strength of the signal being radiated by the pen and received by the conductors in the surface. Thus, if the pen is positioned over one area of the tablet, that portion of the tablet will obviously have a greater signal strength. Second, the signal is received by the entire tablet since it is acting as an antenna; however, since the signal being received by all of the major and minor conductors of the tablet are interconnected, the signal is presented to any one conductor as not only the result of received signal but also the result of the signal received by all adjacent conductors attenuated by the interconnecting resistances. When no radiating point source such as a pen or cursor is in the proximity of the tablet, other signal sources such as EMI or noise from electrical equipment in proximity to the tablet is effectively ignored unless a signal source becomes strong enough to overcome a predetermined threshhold signal level in the tablet. When a pen, radiating a predetermined frequency is positioned close to the tablet surface, the effect of the bell-shaped curve 80 is to substantially attenuate other interfering signals; further, the utilization of only those three conductors with the highest signal level to calculate pen position further "ignores" such noise received by the antenna/tablet. The system of the present invention is not absolute amplitude sensitive (the pen signal can vary-the paper pad can vary in thickness), the system is not sensitive to phase shifts and is not dependent on time or frequency.

While the system of the present invention may be implemented with a variety of standard circuits, certain standard readily available circuit chips and devices have been found most useful. For example, the microprocessor 60 may be formed from a processor available in the marketplace under the designation Zilog Z8, the selectors are standard circuits CD4051. The analog-to-digital converter may take a variety of standardized forms; further, the digitizing of the analog signals may be accomplished by a technique shown and described in the above copending patent application.

We claim:

1. In an apparatus for determining a position of an instrument on a tablet surface, an improvement comprising:
   a. a plurality of parallel conductors separated by a predetermined distance, said conductors extending in a plane parallel to said surface and insulated therefrom;
   b. each of said conductors connected to adjacent conductors through a predetermined resistance;
   c. selected ones of said conductors connected to output terminals for connection to signal sensing circuits, all unselected ones of said conductors remaining electrically unconnected except to said adjacent conductors.

2. A graphic tablet system comprising:
   a. signal radiating means
   b. an antenna for receiving signals radiated by said radiating means, said antenna including:
      1. a plurality of parallel conductors separated by a predetermined distance, said conductors extending in a plane parallel to a surface and insulated therefrom:
      2. each of said conductors connected to adjacent conductors through a predetermined resistance:
   c. a signal sensing circuit connected to said conductors for selecting a first conductor having a largest signal thereon and a second and a third conductor adjacent said first conductor and positioned on either side of said first conductor;

d. means responsive to the signals on said three conductors for generating a signal corresponding to a position, measured perpendicular to said conductors, of said signal radiating means relative to said three conductors.

3. The combination set forth in claim 2 wherein said antenna includes selected ones of said conductors connected to said signal sensing circuit and unselected ones of said conductors positioned between said selected conductors, said unselected conductors remaining electrically unconnected except to said adjacent conductors.

4. In an apparatus for determining a position of an instrument on a tablet surface, an improvement comprising:
 a. a first plurality of conductors
  1. said conductors separated by a predetermined distance, and extending in a plane parallel to said surface and insulated therefrom;
  2. each of said conductors connected to adjacent conductors through a predetermined resistance;
 b. selected ones of said conductors connected to output terminals for connection to signal sensing circuits, all unselected ones of said conductors remaining electrically unconnected except to said adjacent conductors;
 c. a second plurality of parallel conductors, insulated from said first plurality of parallel conductors and oriented orthogonally with respect thereto;
  1. said second plurality of parallel conductors separated by a predetermined distance and extending in a plane parallel to said surface and insulated therefrom;
  2. each conductor of said second plurality of conductors connected to adjacent conductors through a predetermined resistance;
  3. selected ones of said second plurality of conductors connected to output terminals for connection to signal sensing circuits, all unselected ones of said second plurality of conductors remaining electrically unconnected except to said adjacent conductors.

5. A method for determining a position of an instrument on a surface having a plurality of parallel conductors in said surface, each of said conductors having a predetermined position address, comprising the steps:
 a. generating a signal;
 b. transmitting said signal from said instrument into said surface to cause signals to appear on each of said conductors;
 c. selecting a conductor having a signal with the highest amplitude appearing thereon;
 d. measuring the amplitude of the signal on the selected conductor and the amplitudes of the signals on the two conductors adjacent said selected conductor;
 e. generating a signal from said measured amplitudes proportional to a distance on said surface from said selected conductor to said instrument.

6. A method for determining a position of an instrument on a surface having first and second pluralities of parallel conductors arranged orthogonally in X and Y directions, each of said conductors having a predetermined position address comprising the steps:
 a. generating a signal;
 b. transmitting said signal from said instrument into said surface to cause signals to appear on each of said conductors;
 c. selecting an X conductor having a signal with a highest amplitude appearing thereon;
 d. measuring a first signal amplitude on the selected conductor, and measuring a second and a third signal amplitudes, respectively, on two X conductors adjacent said selected conductor;
 e. selecting a lowest of said signal amplitudes and subtracting said lowest signal amplitude from a remaining two signal amplitudes to form difference signals;
 f. ratioing said difference signals and multiplying by a predetermined constant to form a product;
 g. adding said product to the address of said selected conductor to form an X address of said instrument on said surface; and
 h. simultaneously performing steps c through g on Y conductors to form a Y address of said instrument on said surface.

* * * * *